March 20, 1951 J. LEVY 2,545,476

LOUD-SPEAKER TELEPHONE INTERCOMMUNICATION SYSTEM

Filed May 21, 1948 2 Sheets-Sheet 1

Jacques Levy
by Christy, Parmelee & Strickland
his attorneys

March 20, 1951 J. LEVY 2,545,476

LOUD-SPEAKER TELEPHONE INTERCOMMUNICATION SYSTEM

Filed May 21, 1948 2 Sheets-Sheet 2

Jacques Levy
by Christy, Parmelee & Strickland
his attorneys

Patented Mar. 20, 1951 2,545,476

UNITED STATES PATENT OFFICE 2,545,476

LOUD-SPEAKER TELEPHONE INTERCOMMUNICATION SYSTEM

Jacques Lévy, Paris, France, now by change of name, Jacques Lory

Application May 21, 1948, Serial No. 28,445
In France May 27, 1947

12 Claims. (Cl. 179—1)

The invention has for its object to improve loud speaker telephone installations having two distinct lines, and it is characterized by the fact that there is automatic blocking of the line not used for transmission whilst leaving free the line used for transmission when one of two persons in communication takes over the speaking. This is done in such manner as to avoid the Larsen effect if there is used at each station a separate microphone and loud speaker and so as to avoid confusion or jamming if a single apparatus working alternatively as transmitter and loud speaker is used. This result is attained by disposing in each line a two-valve amplifier, one valve of which is normally blocked by over polarization and is unblocked when the corresponding line is used, the valve not blocked becoming blocked by over polarization when the other line is used.

Upon the accompanying drawing, there is represented diagrammatically and by way of example two methods of carrying the invention into practice, one being applicable to the case of a dissymmetric installation and the other to a symmetric installation.

The advantage of a known installation of this type is that each party can be heard by the other by loud speaker without having to speak in close proximity to the microphone. This result is obtained owing to an amplifier arrangement included in each of the lines connecting the two stations.

However, in the case of an installation comprising at each station a microphone and a loud speaker, the amplification is limited by the starting of oscillations of audible frequency known as the Larsen effect. In the case of an installation comprising a single apparatus at each station, the Larsen effect is not to be feared but it is necessary to block the line not used and to free the line used and this must be done automatically when either one of the two parties takes over the conversation.

It is necessary therefore in both cases to block the line which for the time being is not used for the conversation.

According to the invention, in the case of Figure 1, this result is obtained in the following manner:—one of the amplifier valves of the unused line is blocked by an over polarization (cutoff) due to a more intense anodic current emitted, at this moment, by one of the amplifier valves of the line in use. Moreover, another amplifier valve of one of the lines (line 2) is normally blocked by an over polarization due to an anodic current from the blockable valve of the other line (line 1) in such manner that this valve of line 2 is unblocked only when the said blockable valve of line 1 is blocked, that is to say when one of the speakers uses line 2.

In the corresponding arrangement:

(a) The blocking of the input valve of the amplifier of line 2 is obtained by the tension furnished by a resistance traversed by the anodic current rectified from the output valve of the amplifier of line 1.

(b) The valve normally blocked is the output valve of the amplifier of line 2, its blocking being effected by the tension furnished by another resistance traversed by the anodic current rectified from the output valve of the amplifier of line 1, the intensity of the current being sufficient for producing the blocking even when the installation is not in use.

(c) The blocking of the output valve of the amplifier of line 1 is obtained by the tension furnished by a resistance traversed by the anodic current rectified from a special amplifier, connected in shunt in front of the output valve of line 2.

(d) The anodic current of the output valve of the amplifier of line 1 is rectified by the valve which serves to feed the installation from the sector.

Figure 1:
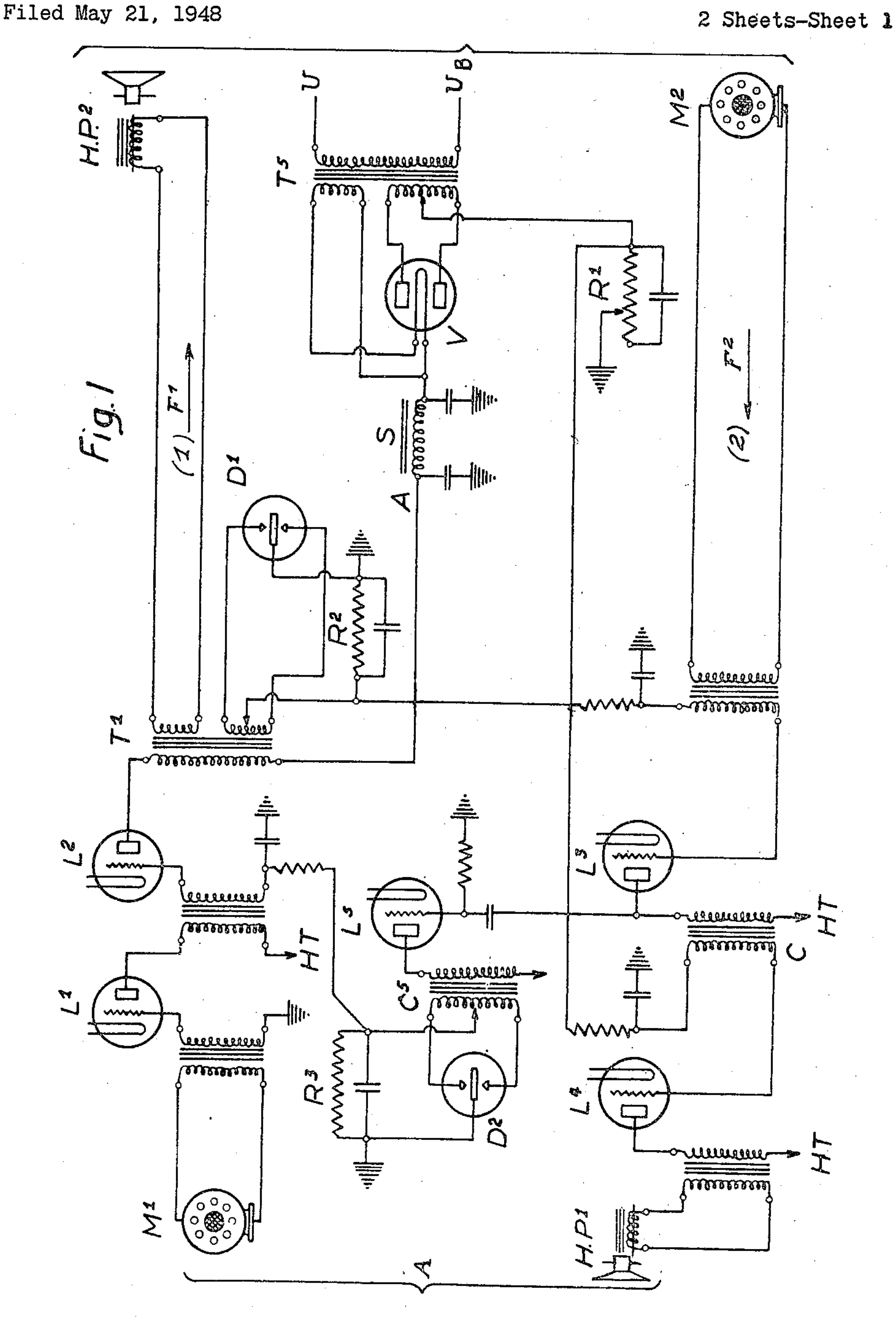
Figure 1 illustrates an installation wherein each station comprises a microphone and a loud speaker.

Figure 1 illustrates an installation of this kind. It comprises two stations A and B each including a microphone and a loud peaker (M1 and HP1 for station A, and M2, HP2 for station B). M1 and HP2 are connected by a line (1) used in the direction of the arrow F1, wherein is inserted an amplifier comprising the valves L1, L2. The valve L2 is coupled by the transformer T1 on the one hand with the loud speaker HP2 and on the other hand with a rectifier D1 at the terminals of which is a resistance R2.

Similarly, the microphone M2 is connected to the loud speaker HP1 by the line (2) used in the direction of the arrow F2, in which line is inserted an amplifier comprising valves L3 and L4.

The anode of L3 is connected on the one hand to the coupling C which supplies tension to the control grid of L4, and on the other hand with the grid of a valve L5. The latter is connected by a coupling C5 with a rectifier D2 at the terminals of which is a resistance R3 having one extremity connected to the grid of the valve L2. Similarly, one of the terminals of the resistance R2 is connected to the grid of the valve L3.

Finally, the anodic current of the valve L2 passes by way of the self induction S, valve V and secondary of a transformer T5, into a variable resistance R1, one terminal of the latter being earthed and the other being connected to the control grid of the valve L4.

The flow of current in the installation is as follows:

The sector U feeds the primary of T5 and, by known means, puts under tension the anode of the valve L2.

The valves L1, L3, L4, L5, are fed from T5 by known means presenting no special feature. The elimination of the Larsen effect is obtained, according to the invention, by the combined action of the rectifiers D1 and D2 and the resistances R1, R2, R3.

The operation is as follows:—Under the influence of the anodic current from the valve L2, the resistance R1 supplies, even during rest periods, a negative tension to the grid of the valve L4 which produces an effect of over polarization (cut-off) and blocks this valve. The current from M2 cannot therefore pass to HP1, so that the sounds from the loud speaker HP2 cannot be transmitted by the microphone M2 to the loud speaker HP1 and the Larsen effect is suppressed.

To this blocking there is added, when speaking before M1, the blocking of the valve L3 due to the negative tension that the resistance R2, under the action of the rectifier D1, supplies to the grid of L3.

It will be seen, therefore, that the valve L4 is blocked whether there is speaking before the microphone M1 or not, whilst the valve L3 is blocked only when there is speaking before M1.

If now the person at station A becomes silent and speech is taken over by the person at station B, the modulation of M2 amplified by L3, which has now become free, arrives partly at L4 and partly at L5. The valve L4 being always blocked transmits nothing, but L5 excites the rectifier D2 which gives into R3 a negative tension for producing a blocking or cut-off effect on the valve L2. The line M1—HP2 is therefore blocked, so that the valve L4 can then be unblocked without risk of starting the Larsen effect.

The unblocking of L4 is produced as follows: the blocking of L2 suppresses the anodic current in R1 and therefore the cut-off tension applied to L4. The valves L3 and L4 being now unblocked, the person at station B can speak to station A and, as L2 is blocked, the reaction of HP1 upon M1 cannot be transmitted to HP2.

Figure 2:
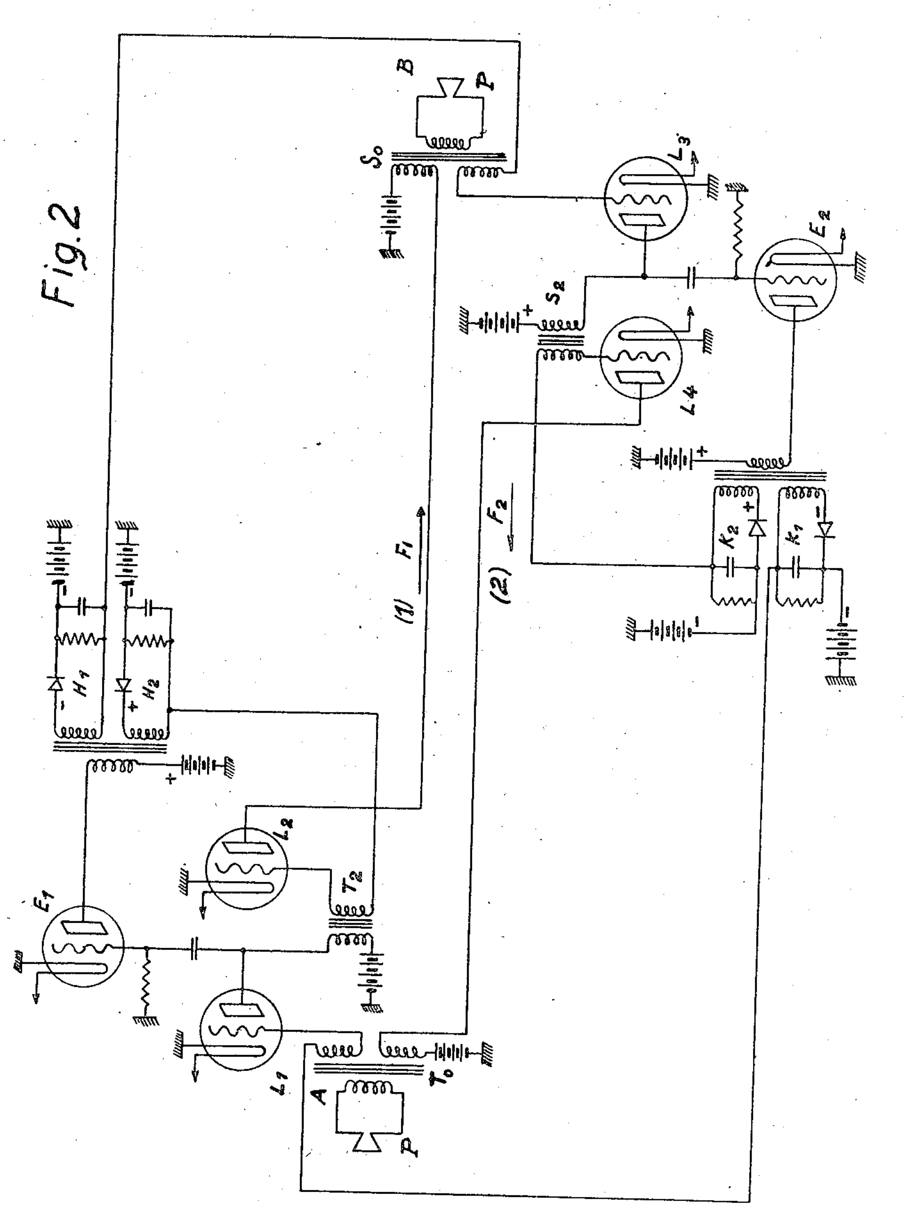
Figure 2 illustrates an installation wherein each station comprises an apparatus working alternatively as transmitter and receiver.

In the installation of Figure 2, each line is provided with an amplifier comprising two valves, one being blocked normally and the other not blocked normally. The blocked valve is unblocked when use is made of the line corresponding with the amplifier, and the non-blocked valve is blocked when the other line is used.

This action of blocking and unblocking is obtained by means identical with that already described in the preceding arrangement. That is to say, one of the amplifier valves of each line is normally blocked by an appropriate over polarization and this valve is unblocked when the corresponding line is used. On the contrary, the valve which normally is not blocked in each amplifier is blocked by over polarization when the other line is used.

The installation in this case is symmetrical. Each line comprises, in addition to the principal amplifier, an auxiliary amplifier, from which the anodic current, rectified by a suitable rectifier, gives: the positive alternation to that one of the valves of the amplifier of the line considered for unblocking, and the negative alternation to that valve of the other line for blocking.

It will be seen from Figure 2 that each station (station A and station B) comprises a single apparatus P serving both as a loud speaker and transmitter. Each apparatus is connected through a coupling (ToSo) with two lines 1 and 2. The line 1 is to be used in the direction of the arrow F1, that is to say from A to B and the line 2 in the opposite direction F2. The two lines are symmetrical. Each comprises a principal amplifier represented here as an amplifier with two valves L1, L2 for the line 1 and L3, L4 for the line 2. It will be seen immediately that when a person speaks at A, the valve L1 is modulated by its grid and transmits through T2 its modulation to the second valve L2 which, by the line 1 and transformer So acts upon B functioning as a receiver.

According to the invention, the valves L2, L4 are blocked by over polarization of the grid. Each station comprises an auxiliary valve (E1, E2) the grid of which is connected to the anode of the corresponding entry valve (L1, L3) of the principal amplifier. The anodic current of each of the valves E1, E2 is rectified by a rectifier (H1, H2 and K1, K2) the positive alternations going to the blocked valves (L2, L4) and the negative alternations to the other valves (L1, L3).

When a person speaks at A, the valve E1 discharges anodic current and this has for effect to remove polarization from the grid of L2 whilst augmenting the negative polarization of the grid of L3 which then becomes over polarized. Consequently, L2 is unblocked and L3 is blocked. The line 1 is now free whilst the line 2 is closed.

When the person at station A ceases to speak and the person at B takes over the conversation, the contrary effect is produced, so that the line 2 becomes free whilst line 1 is blocked.

It will be seen therefore that owing to the provisions of this invention, the line made use of is free but the other line is blocked so that whatever may be the echoes produced in the locality where the communication is received, these cannot have a repercussion towards the transmitting station.

What I claim is:

1. In a two-way communication system, the combination comprising a pair of signal transmission lines respectively having input and output amplifying valves therein, means responsive to the output valve in one of said lines when it is not transmitting a signal for rendering the output valve in the other of aid lines inoperative, means responsive to an increased output of the output valve in said one line upon the transmission of a signal over said one line for rendering the input valve of the other of said lines inoperative, and means responsive to operation of the input valve in said other line in response to the transmission of a signal over said other line for rendering the output valve of said one line inoperative whereby said first-named means is rendered ineffective.

2. In a two-way communication system, the combination comprising a pair of signal transmission lines, one of said lines having input and output amplifying valves therein, a first biasing circuit normally energized by the other of said lines and including a rectifier and a biasing resistor for applying a cut-off bias to said output valve, a second biasing circuit energized in response to the transmission of a signal over said one line and including a rectifier and biasing resistor for applying a cut-off bias to said input valve to thereby prevent operation of said one line at all times when said other line is transmitting, a third biasing circuit energized by said input valve in response to the impression of a signal on said one line and including a rectifier and a biasing resistor for applying a cut-off bias to said other line, said other line having an amplifying valve therein to which said last-named cut-off bias is applied for rendering said other line inoperative and thereby said first biasing circuit ineffective to perform its normal function of applying a cut-off bias to said output valve.

3. In a two-way communication system having a pair of separate communication lines between spaced stations, a control which comprises a first grid controlled amplifier in one of said lines, means whereby said first grid controlled amplifier is normally operable to produce a control voltage when said system is not being used to transmit sound, second and third grid controlled amplifiers in the other of said lines, means operated by said control voltage for applying a cut-off bias to said third amplifier for preventing the transmission of sound over said other line, and means operated by said second amplifier for applying a cut-off bias to said first amplifier to remove said control voltage from said last-named means and thereby render said other line operative to transmit sound.

4. In a communication system, a transmission line having first and second stages of amplification therein, circuit means normally operative for applying a cut-off bias to said second stage to render said line normally inoperative, and means responsive to the reception of a signal at said first stage for removing the bias from said second stage to render said second stage operative to amplify the signals received by said first stage.

5. In a communication system, a transmission line having first and second stages of amplification therein, circuit means normally operative for applying a cut-off bias to said second stage to render said line normally inoperative, and a control valve having a grid connected to the output of said first stage and its anode connected to said circuit means for removing said cut-off bias from said second stage in response to a signal transmitted over said line to said first stage.

6. In a communication system, a first transmission line having at least one stage of amplification therein, a second transmission line having at least two stages of amplification therein, a circuit operated by said first line for applying a cut-off bias to the second stage of amplification in said second line to render said second line normally inoperative, and a control valve operated by the first stage of amplification in said second line in response to a signal being transmitted over said second line for applying a cut-off bias to the amplifying stage in said first line to render said first line, and the circuit operated thereby inoperative.

7. In a two-way communication system, the combination comprising a pair of signal transmission lines respectively having input and output amplifying valves therein, a first biasing circuit responsive to operation of the output valve in one of said lines for biasing the output valve in the other of said lines to cut-off, a second biasing circuit operated by the output valve in said one line when it is transmitting signals for biasing to cut-off the input valve in the said other line, and a third biasing circuit actuated by the input valve in said other line when a signal is impressed on said other line for biasing the output valve of said one line to cut-off whereby said first biasing circuit is rendered ineffective.

8. In a two-way communication system, the combination comprising a pair of signal transmission lines respectively having input and output amplifying valves therein, a first biasing circuit normally operative for biasing the output valve in one of said lines to cut-off, a second biasing circuit operative in response to transmission of a signal over the other of said lines for biasing the input valve in said one line to cut-off, a third biasing circuit responsive to the impression of a signal on said one line for rendering said first biasing circuit inoperative.

9. In a two-way communication system, the combination comprising a pair of signal transmission lines, one of said lines having input and output amplifying valves therein, a first biasing circuit normally operative for biasing said output valve to cut-off, a second biasing circuit operative in response to transmission of a signal over the other of said lines for biasing said input valve to cut-off, a third biasing circuit responsive to the impression of a signal to be transmitted on said one line for rendering said first biasing circuit inoperative.

10. In a two-way communication system, the combination comprising a pair of signal transmission lines, one of said lines having input and output amplifying valves connected in series therein, a first biasing circuit normally operative for biasing said output valve to cut-off, a second biasing circuit operative in response to transmission of a signal over the other of said lines for biasing said input valve to cut-off, a third biasing circuit responsive to the impression of a signal to be transmitted on said one line for rendering said first biasing circuit inoperative, and for rendering said other transmission line inoperative to transmit a signal.

11. In a communication system of the character described, the combination comprising a signal transmission line having input and output amplifying valves therein, a first biasing circuit normally operative for biasing said output valve to cut-off, and a control circuit rendered operative by said input valve in response to the impression of a signal on the line to render said biasing circuit inoperative and thereby render said output valve operative to amplify a signal fed thereto by said input valve.

12. In a communication system of the character described, the combination comprising a signal transmission line having input and output amplifying valves therein, a first biasing circuit normally operative for biasing said output valve to cut-off, a control circuit rendered operative by said input valve in response to the impression of a signal on the line to render said biasing circuit inoperative and thereby render said output valve operative to amplify a signal fed thereto by said input valve, a second signal transmission line, and circuit means responsive to operation of said second line for biasing said input valve to cut-off to thereby prevent operation of said control circuit.

JACQUES LÉVY.

REFERENCES CITED

The following references are of record in the file of this patent:

UNITED STATES PATENTS

| Number | Name | Date |
|---|---|---|
| 2,199,220 | French | Apr. 30, 1940 |
| 2,205,142 | Hoard | June 8, 1940 |
| 2,267,622 | Mitchell | Dec. 23, 1941 |
| 2,341,539 | Giannini | Feb. 15, 1944 |
| 2,449,344 | Tschumi | Sept. 14, 1948 |